United States Patent [19]
Rehman

[11] Patent Number: 5,925,176
[45] Date of Patent: Jul. 20, 1999

[54] SALT-BASED INK COMPOSITIONS

[75] Inventor: Zia ur Rehman, Corvallis, Oreg.

[73] Assignee: Hewlett-Packard Company, Palo Alto, Calif.

[21] Appl. No.: 08/873,615

[22] Filed: Jun. 11, 1997

[51] Int. Cl.$^6$ .................................................. C09D 11/02
[52] U.S. Cl. .................................... 106/31.43; 106/31.59; 106/31.75; 106/31.89
[58] Field of Search .............................. 106/31.43, 31.59, 106/31.75, 31.89

[56] References Cited

U.S. PATENT DOCUMENTS

| | | | |
|---|---|---|---|
| 5,108,503 | 4/1992 | Hindagolla et al. | 106/31.47 |
| 5,451,251 | 9/1995 | Mafune et al. | 106/41.48 |
| 5,501,725 | 3/1996 | Lauw et al. | 106/31.59 |
| 5,534,051 | 7/1996 | Lauw et al. | 106/31.27 |
| 5,536,306 | 7/1996 | Johnson et al. | 106/31.58 |
| 5,626,655 | 5/1997 | Pawlowski et al. | 106/31.27 |
| 5,693,129 | 12/1997 | Lin | 106/31.43 |
| 5,730,789 | 3/1998 | Botros | 106/31.43 |
| 5,730,790 | 3/1998 | Rehman | 106/31.43 |

FOREIGN PATENT DOCUMENTS

| | | | |
|---|---|---|---|
| 0592774A2 | 4/1994 | European Pat. Off. | C09D 11/00 |
| 08333533 | 6/1995 | Japan | C09D 11/00 |

OTHER PUBLICATIONS

XP002086906, Jul. 1984, Derwent (abstract).

*Primary Examiner*—Helene Klemanski

[57] ABSTRACT

Ink compositions are described comprising a combination of an ammonium carboxylate salt or salts and one or more surfactants, preferably non-ionic ethoxylated surfactants, hydroxylated or alkoxylated acetylenic polyethylene oxide surfactants, or anionic phosphate esters. The ink compositions substantially prevent thermally-induced phase separation up to about 60° C. and, more preferably, up to about 70° C. The ink compositions also are relatively non-toxic, resist the tendency to decel at high frequency print rates, and furthermore provide superior light fastness, edge acuity, and water fastness when printed on conventional or special media. The described ink compositions are particularly suitable for color ink-jet printing over a wide range of print media.

19 Claims, No Drawings

SALT-BASED INK COMPOSITIONS

FIELD OF THE INVENTION

The present invention relates to non-toxic, salt-based ink compositions resistant to thermally-induced phase separation.

BACKGROUND OF THE INVENTION

Ink-jet printers have become established as reliable and efficient devices. Typically, an ink-jet printer utilizes a pen mounted on a carriage which is moved relative to a printing surface. Small droplets of ink are formed and ejected from the pen and toward a printing medium. Such pens include print heads with orifice plates having very small nozzles through which ink droplets are ejected by quickly heating a volume of ink within an ink chamber adjacent the nozzle. Ink in the chamber may be heated, for example, using a resistor. This process causes ink within the chamber to super heat and form a vapor bubble. The rapidly expanding ink vapor forces a drop of ink through the orifice.

Recently, innovations in thermal ink-jet printing have concerned ink compositions capable of high-quality color printing using yellow-, magenta-, and cyan-colored ink compositions. These three primary colors, when mixed in various combinations, provide a full range of colors. Black printing may be accomplished by providing a separate black ink or by producing a composite black using the three primary color inks.

Unfortunately, ink compositions that provide improved text print quality may have increased amounts of bleed. More specifically, when inks of two different colors are printed next to each other, they may diffuse into each other, resulting in a ragged border therebetween. Bleed occurs as colors mix both on the surface of the print media as well as within the print media.

Prior approaches to reducing the amount of bleed have included the use of heat sources, such as heated platens, and/or special paper formulations. Heat sources add to the cost and complexity of the printers while inks that require special papers limit the applications for which the printer is useful. Prior approaches to reducing the amount of color-to-color bleed also include adding surfactants to the ink compositions. Surfactants reduce color-to-color bleed typically by increasing the rate inks penetrate the print media. Increasing the ink-composition penetration rate, however, reduces edge acuity.

Moreover, finding a suitable surfactant is difficult. A suitable surfactant modifies the surface energy of the print media so as to increase the ink compositions vertical penetration rate (i.e., the rate at which the ink enters the print media) and reduces the extent of lateral diffusion on the surface of the print media, thereby reducing bleed. The surfactant must, however, possess the appropriate hydrophile lipophile balance (HLB balance). A surfactant having a higher HLB balance value tends to be relatively water soluble and, thus, does not have many of the disadvantages of typical surfactants. Such surfactants also tend to be relatively thermally stable. However, such surfactants also tend to cause more lateral diffusion of ink along the surface of the print media, thereby causing more undesirable bleed. A surfactant having a lower HLB balance value generally, is less soluble in water and, therefore, causes less lateral diffusion of ink along the surface of the print media. Less soluble surfactants, thus, cause less bleed. Unfortunately, less soluble surfactants are also less thermally stable.

More specifically, addition of surfactants, especially those with low HLB values, typically causes ink compositions to be more susceptible to thermally-induced phase separation, which lowers the cloud point of the ink composition. The term "cloud point" refers to the temperature at which phase separation of the ink composition occurs (i.e., the temperature at which the surfactant is no longer soluble in the ink composition). Most ink compositions typically have a cloud point of about 45° C. or lower.

When the cloud point is reached the ink composition has a "cloudy" appearance and multiple phases. Using an ink composition that is at or near its cloud point (or thermally-induced phase separation point) substantially deteriorates the print quality. That is, firing or ejecting ink droplets comprised of an ink composition at or near its cloud point, leads to variable ink droplet velocities and, hence, poor print quality caused by the ink droplets missing their intended targets. Accordingly, in the past, an ink composition including surfactants of low HLB balance values has been desirable to limit bleed, however, such compositions were undesirable due to their lack of thermal stability. An ink composition susceptible to thermally-induced phase separation limits the temperature range over which the composition may be used and stored. Ink compositions having high cloud points (i.e., at least about 60° C. and preferably about 70° C.) are desirable when the ink composition must be stored and/or used in warm environments or climates.

Prior approaches to reducing the amount of black-to-color bleed include, for example, adding one or more salts to the ink composition. Such salts typically include cationic counterions from Group IIA, Group IIIA, transition metals of Group IIIB, and lanthanides, and therefore are relatively toxic. Additionally, such salts tend to cause the ink composition droplets to "decel," which refers to a phenomena that occurs in a nozzle of an ink-jet pen. At rapid droplet ejection frequency the vaporization and ejection of ink droplets of a particular ink composition can suddenly slow or stop completely, i.e., decel. It appears that the reduction in droplet ejection frequency due to decel is a result of a reaction of the salt in the ink composition with the nozzle surface.

Still another important characteristic of ink compositions is the print quality and stability of images printed on "special media," such as starch-coated substrates, silica-coated substrates, clay-coated substrates, and polymeric media, such as transparencies. Of particular interest is the light fastness of the ink composition's printed image on such media. The term "light fastness" refers to the degree the printed image deteriorates due to light and oxidants present in the environment. Many presently available ink compositions do not provide suitable image-quality printing on such media.

A need remains for ink compositions that are resistant to thermally-induced phase separation, do not bleed, and possess other desirable properties, such as a low toxicity level, a relatively long shelf-life, decel resistance, and superior light fastness on special media. Ink compositions are known that possess one or more of the foregoing properties. Few ink compositions possess all of the foregoing properties as improvement in one property often results in degradation of another property, or other properties, of the composition.

SUMMARY OF THE INVENTION

The present invention provides ink compositions comprising an ammonium carboxylate salt or salts and one or more surfactants, preferably ethoxylated surfactants, or hydroxylated or alkoxylated acetylenic polyethylene oxide surfactants. The ink compositions substantially prevent thermally-induced phase separation up to about 60° C. and, more preferably, up to about 70° C. The ink compositions of the present invention also are relatively non-toxic, resist the tendency to decel at high frequency print rates, and are particularly suitable for color ink-jet printing on a wide range of print media. Additionally, the present ink compositions provide superior light fastness, edge acuity, and water fastness when printed on conventional or special media.

A preferred embodiment of the ink composition of the present invention comprises, by weight, from about 1 percent to about 7 percent dye, from about 0.25 percent to about 5 percent non-ionic ethoxylated surfactant or surfactants, from about 0 percent to about 40 percent water-miscible organic solvent, from about 2 percent to about 12 percent ammonium carboxylate salt or salts, with the balance being mostly water. Other adjuncts commonly found in ink-jet ink compositions, such as pH buffers and biocides or fungicides, also may be added to the present ink compositions.

DESCRIPTION OF PREFERRED EMBODIMENTS

The present invention concerns ink compositions preferably, but not necessarily, for use with thermal ink-jet printers. The specially formulated ink compositions substantially prevent phase separation of the composition components at elevated temperatures, reduce bleed, improve light fastness, and limit ink composition toxicity levels.

The ink compositions of the present invention may be used to print images on a wide variety of materials. Such materials, which are referred to herein as "media" or "print media," include without limitation, ordinary cellulosic paper and "special media," such as starch coated media and media coated with silica and/or clay, film materials, non-porous transparent polyester films, and similar materials. Such media may also include special additives such as mordents, including without limitation, polyhydroxy quaternary ammonium salts. The ink compositions of the present invention are especially well-suited for storage and/or printing in relatively warm environments or climates.

I. Ink Compositions

Working embodiments of the ink compositions comprise, by weight (all percents stated herein are by weight unless indicated otherwise), from about 0.5 to about 20% dye or dyes, from about 0.25 to about 10 percent surfactant or surfactants, and from about 2 percent to about 15 percent of an ammonium carboxylate salt or salts. A currently preferred salt is ammonium hydrogen citrate, ammonium lactate, ammonium di-hydrogen citrate and mixtures thereof, and a currently preferred surfactant is a non-ionic, secondary alcohol ethoxylate having an aliphatic chain of from about 12 to about 18 carbon atoms, and from about 4 to about 8 ethoxylate groups and a Hydrophile Lipophile Balance (HLB balance) of from about 10 to about 13, according to the Imperial Chemical Industry (ICI) standard, as known to those skilled in the art. The ICI standard for surfactant characteristics ranges from a value of 1 to 20. The lowest value of 1 represents a surfactant having primarily lipophilic characteristics and the high value of 20 represents a surfactant having primarily hydrophilic characteristics. The remainder of the ink compositions are mostly water; however, other components commonly found in ink compositions, such as biocides, organic solvents, pH buffers, and any other compounds now known or hereafter discovered that are useful in similar ink compositions, also may be used to form the ink compositions of the present invention.

Good results are achieved when the ink compositions include from about 1 percent to about 5 percent dye(s), from about 0.5 percent to about 5 percent surfactant(s) and the ammonium carboxylate salt(s) is present in the ink composition in a range of from about 4 percent to about 10 percent. Best results currently appear to be achieved when the composition comprises about 1.5 percent surfactant and about 8 percent ammonium carboxylate salt.

In setting dye concentrations, good results can be obtained by providing an amount of dye that results in an absorbance within a desired range. For example, good results are obtained when the following dyes in the ink compositions provide the results listed in Table I.

TABLE I

| Dye | NMax | *Abs (±0.005) |
| --- | --- | --- |
| TMA Acid Yellow 23 | 428 | 0.13 |
| Direct Yellow 132 | 402 | 0.12 |
| Na Acid Blue 9 | 628 | 0.16 |
| TMA Direct Blue 199 | 618 | 0.09 |
| Reactive Red 180 | 514 | 0.09 |
| Lithium Acid Red 52 | 562 | 0.14 |
| Direct Yellow 132 and | 410 | 0.09 |
| Acid Yellow 23 Combination | 426 | 0.09 |
| Magenta M377 and | 518 | 0.09 |
| Acid Red 52 (Li) Combination | 562 | 0.138 |

*absorbance units at 1:10,000 dilutions, measured utilizing a Hewlett-Packard UV/VIS II 8452A spectrometer.

The purity of all components used in the present ink compositions is that employed in normal commercial practice for forming ink compositions, particularly those ink compositions developed for thermal ink-jet printers.

II. Ink Composition Materials

1. Dyes

In order to produce ink compositions in accordance with the present invention, one or more dyes is first selected. A wide range of useful dyes is available; the dye may be water-soluble, water-insoluble, black or colored. The term "water-soluble" as used herein, refers to dyes whose solubility limit in water is sufficiently high so as to produce desired color saturation of printed images. Generally, a solubility limit in water exceeding 2 percent by weight will meet most desired color saturation goals. The term "water-insoluble" as used herein, refers to dyes which evidence no appreciable dissolution of the dye in water at room temperature.

Water-soluble dyes are the preferred class of dyes for forming the ink compositions of the present invention. Suitable water-soluble dyes include, but are not limited to, the following dyes: Acid Red 52, Acid Red 289, Acid Red 27, Reactive Red 180, Direct Red 227, Basic Red 3, Acid Yellow 23, Direct Yellow 86, Direct Yellow 132, Basic Yellow 9, Basic Yellow 11, Acid Blue 9, Basic Blue 9, Direct Blue 199, Process Reactive Black 31, Food Black 2, Direct Black 19, Magentas M377 (an azo dye having a tri-azine ring, available from Ilford AG, RueDel'Industrie, CH-1700 Fribourg, Switzerland), and mixtures thereof.

Water-insoluble dyes may be suitable for use with the present ink compositions. Such dyes include, without limitation, solvent dyes, vat dyes and certain mordant dyes. These dyes are available in a variety of blacks and colors. Examples, without limitation, of water-insoluble solvent dyes include Solvent Black (SB) 3 SB5, SB46, SB48, Solvent Blue 36, Solvent Blue 59, Solvent Red 1, Solvent Red 24, Solvent Red 68, Solvent Yellow (SY) 13, SY14, SY33, and SY93. Examples, without limitation, of suitable vat dyes include Vat Black 9, Vat Black 25, Vat Blue 1, Vat Blue 6, Vat Red 10, Vat Yellow 4, and mixtures thereof.

Examples of water-insoluble mordant dyes include, without limitation, Mordant Blue 1, Mordant Red 7, Mordant Red 9, Mordant Yellow 26, and mixtures thereof.

The dyes discussed above often include counter-ions for charge balance. Anionic water-soluble dyes, such as Acid Red 27, typically have sodium counter-ions. However, the counter-ion also may be $K^+$, $Li^+$ and $NH^+_4$. For Acid Yellow 23 and Direct Blue 199, tetramethyl ammonium [$(CH_3)_4N^+$, TMA] counter-ion is preferred because this counter-ion apparently further reduces nozzle crusting. Cationic water-soluble dyes, such as Basic Yellow 11, typically include counter-ions such as, $Cl^-$, $Br^-$, $ZnCl_4^{2-}$, and $NO_3^-$.

The particular dyes discussed are intended to be illustrative only. It should be understood that any dye, now known or hereinafter developed, can be used to practice the invention, as long as such dye has suitable characteristics. Suitable characteristics include good hue, high chroma, acceptable photofade characteristics, sufficiently high optical densities, sufficient solubilities in the fluid acting as the ink vehicle (preferably water for the present invention), good saturation and crusting performance, and compatibility with other ink-composition components. Moreover, suitable dyes do not detract from the use of the ink composition for the production of thermal ink-jet printed images.

2. Surfactants

At least one surfactant is added to the ink compositions of the present invention to provide color-to-color bleed control, promote uniform ink coverage and leveling of ink on the print media, produce a higher image quality, and retard ink evaporation. Surfactants may also shorten ink-image drying time by causing the ink to penetrate into the print media.

Preferred surfactants for use in the ink compositions of the present invention include non-ionic ethoxylate surfactants (e.g., secondary alcohol ethoxylate surfactants and alkylphenyl ester surfactants), hydroxylated or alkoxylated acetylenic polyethylene oxides surfactants, and anionic surfactants, such as phosphate esters.

Non-ionic secondary alcohol ethoxylate surfactants are available from, for example, Union Carbide (Houston, Tex.) as the TERGITOL™ series, such as TERGITOL™ 15-S-5 and TERGITOL™ 15-S-7. The secondary alcohol ethoxylates contain (a) an aliphatic chain having a prescribed number of carbon atoms in the chain and (b) a prescribed number of ethoxylate groups. These surfactants may be provided as mixtures of ethoxylates and so are described in terms of the predominate compound in the mixture. The secondary alcohol ethoxylates suitably employed in the practice of the invention predominately have from about 12 to about 18 carbon atoms in the aliphatic chain, The number of ethoxylate groups is predominately in the range of 4 to 8 units and, preferably, in the range of 5 to 7 units. Thus, "TERGITOL™ 15-S-5" represents a secondary alcohol ethoxylate surfactant predominantly having 15 carbons in its aliphatic chain and 5 ethoxylate groups. It currently appears that the mixture of secondary alcohol ethoxylates in which the predominate number of ethoxylate groups is less than 4 is not sufficiently soluble in the ink, while if the predominate number of ethoxylate groups is greater than 8 the surfactant loses effectiveness in preventing color bleed.

Another representative ethoxylated non-ionic surfactant is available from Aldrich Chemical Company—Fluka Chemical (Milwaukee, Wis.) under the GENAPOL® series. This material consists of a $C_{12}$–$C_{16}$ alcohol ethoxylate, and is represented by Formula I as:

$$RO(CH_2CH_2O)_nH \qquad (1)$$

wherein $R=C_{12}$ to $C_{16}$, with a typical chain length of 13 carbon atoms; and n=1 to 11.5.

Further representative ethoxylated non-ionic surfactants are available from Rhone-Poulenc Company (Cranbury, N.J.) under the name IGEPAL® CO. These materials are all produced from reacting nonylphenol ($C_9H_{19}C_5H_4OH$) with ethylene oxide ($C_2H_4O$). For example, the following specific alkylphenyl ethoxylated non-ionic surfactants are available under the IGEPALE® CO brand (listed by product number followed by the percentage of ethylene oxide therein): CO-210 (23%), CO-430 (44%), CO-520 (50%), CO-530 (54%), CO-610 (60%), CO-620 (63%), CO-630 (65%), CO-660 (66%) CO-710 (68%), CO-720 (71%), CO-730 (75%), CO-850 (80%) CO-880 (86%), CO-887 (86%), CO-890 (89%), CO-897 (89%) CO-970 (91%), CO-977 (91%), CO-987 (93%), CO-997 (95%). These surfactants are listed under CAS# 9016-45-9.

Similar representative ethoxylated non-ionic surfactants are available from Shell Chemical Company (Houston, Tex.) under the name NEODOL®. Other non-ionic alcohol ethoxylate surfactants may be used in the present invention, such as polyethylene thioethers available from Rhone Poulenc Company under the name ALCODET™-260 or MIRAPON™-E825.

Hydroxylated or alkoxylated acetylenic polyethylene oxide surfactants are available from, for example, Air Products and Chemicals (Lehigh Valley, Pa.) as the SURFYNOL™ series, such as SURFYNOL™ 104, SURFYNOL™ CT-111, SURFYNOL™ CT-121, and SURFYNOL™ 465. The SURFYNOLS may be represented by Formula 2:

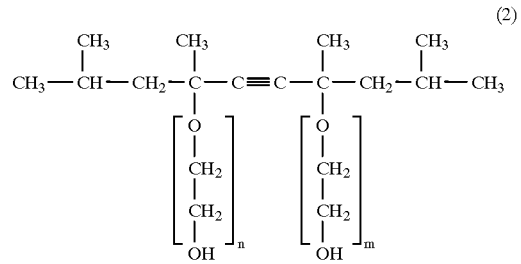

wherein n+m=0 to 50.

Anionic surfactants useful in the present invention, such as phosphate esters, are available from Rhone-Poulenc Company under the name RHODAFAC™ RS-610.

In a preferred embodiment, the ink composition will include about 0.25 to about 10 percent by weight total surfactant (e.g., one of the surfactants listed above, mixtures of the foregoing surfactants, or other non-ionic ethoxylate surfactants, hydroxylated or alkoxylated acetylenic polyethylene oxide surfactants, or anionic surfactants, such as phosphate esters, used alone or in combination). Good results are achieved when the total surfactant concentration in the ink composition is from about 0.5 to about 5 percent by weight. The best results to date have been achieved when the surfactant(s) is a secondary alcohol ethoxylate having an aliphatic chain of from about 12 to about 18 carbon atoms, preferably about 15 carbon atoms, and from about 4 to about 8 ethoxylate groups, preferably about 5 to about 7 ethoxylate groups, preferably having an HLB balance of from about 10 to about 13, and with about 1.5 percent by weight of the surfactant(s) being present in the ink composition.

3. Salts

One or more ammonium carboxylate salts is added to the ink compositions of the present invention. Such salts provide black-to-color bleed control and reduce the occurrence of phase separation of the ink compositions at higher temperatures (i.e., raise the cloud point of the ink compositions to at least about 60° C. and, typically, to about 70° C.).

Without being bound to a particular theory, it is suggested that the reduction of phase separation of the ink composition at elevated temperatures is a result of the ammonium carboxylate's affect on the surfactant equilibrium. As a result, the ink composition is less temperature sensitive, thereby avoiding phase separation during firing and improving stability in warmer climates.

Currently preferred ammonium carboxylate salts of the present invention comprise compounds represented by Formula 3:

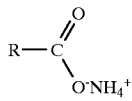

(3)

wherein R may be hydrogen (e.g., ammonium formate) or R may include from about 1 carbon atom (e.g., ammonium acetate) to about 40 carbon atoms (e.g., ammonium stearate with 36 carbon atoms) and can be selected from the following: hydrogen, alkanes, alkenes, alkynes, alkoxys, carboxylates, ammonium carboxylates, and mixtures thereof, including both straight-chained and branched-chained structures and, further, including all stereoisomers. The alkanes, alkenes, alkynes, and alkoxys may also include hydroxyl groups, sulfhydryl groups, amines, carbonyls, carboxyl groups, halogens and mixtures thereof.

Good results have been achieved when using ammonium carboxylates that are at least partially soluble in water, such as, ammonium hydrogen citrate, ammonium lactate, ammonium formate, ammonium gluconate, ammonium tartrate, ammonium succinate, ammonium malonate, ammonium fumarate, ammonium malate, ammonium sebacate, ammonium laurate, ammonium glutarate, ammonium acetate, ammonium oxylate, ammonium adipicate, ammonium pimelicate, ammonium subericate, ammonium azelaicate, and mixtures thereof. Best results currently have been achieved when the ammonium carboxylate is selected form the group consisting of ammonium hydrogen citrate, ammonium lactate, and mixtures thereof.

4. Organic Solvents

One or more organic solvents may be used to prepare the ink compositions of the present invention. A suitable solvent typically is used to form a mixture comprising the selected dye materials. In a preferred embodiment, the ink compositions include from about 0 to about 40 percent by weight water-soluble organic solvent. Exemplary water-soluble organic solvents suitable for this purpose include, but are not limited to, $C_1$ to $C_4$ aliphatic alcohols (e.g., methanol, ethanol, n-propanol, isopropanol, n-butanol, sec-butanol, tert-butanol, or isobutanol), amides (e.g., formamide or dimethylacetamide), ketones, polyketones or ketoalcohols (e.g., acetone or diacetone alcohol), ethers (e.g., tetrahydrofuran or dioxane), nitrogen-containing heterocyclic ketones (2-pyrrolidone, N-methyl-pyrrolid-2-one, or 1,3 dimethylimidazolid-2-one), polyalkylene glycols (e.g., polyethylene glycol or polypropylene glycol), alkylene glycols and thioglycols containing $C_2$ to $C_6$ alkylene groups (e.g., ethylene glycol, propylene glycol, butylene glycol, triethylene glycol, thiodiglycol, hexylene glycol, and diethylene glycol), glycerol, polyols (e.g., 1,2,6-hexanetriol), and lower alkyl ethers of polyhydric alcohols such as 2-methoxyethanol, 2-(2-methoxyethoxy)ethanol, 2-(2-ethoxyethoxy)ethanol, 2-methoxy-2-ethoxy-2-ethoxyethanol, 2-[2-(2-methoxyethoxy)ethoxy]ethanol, and 2-[2-(2-ethoxyethoxy)ethoxy]ethanol.

From the foregoing group of solvents, the preferred solvents include glycols and glycol ethers (e.g., ethylene glycol, diethylene glycol, triethylene glycol, or 2-methoxy-2-ethoxy-2-ethoxyethanol), polyethylene glycols with molecular weights of up to 500, and heterocyclic ketones (e.g., 2-pyrrolidone, N-methylpyrrolid-2-one or 1,3-dimethylimidazolid-2-one). Currently, the best results have been achieved by using from about 1 to about 20 percent 1,5 pentanediol (1,5 pentamethylene glycol), from about 1 to about 20 percent 2-pyrrolidone, and/or about 1 to about 20 percent ethylhydroxy-propanediol (EHPD).

5. pH Buffers

The ink compositions of the present invention preferably have pH values of from about 3.5 to about 7.5, and more preferably having a pH value of about 4.5.

The pH of the ink composition may be adjusted through the addition of any mineral acid, organic acid, and mixtures thereof. For example, suitable mineral acids may be dilute nitric acid, phosphoric acid, hydrochloric acid, sulfuric acid, and mixtures thereof. For pH ranges from about 7 to about 9.5, at least one pH buffer at a concentration of from about 0.1 percent to about 7 percent by weight also is suitable. The buffers preferably have pKa's ranging from about 6.5 to about 10. Buffers such as TES (N-tris[hydroxymethyl]-methyl-2-aminoethanesulfonic acid), BICINE (N,N-bis[2-hydroxyethyl]glycine), TEA (triethanolamine), TRIS (tris[hydroxymethyl]-aminomethane), and BORAX (sodium borate decahydrate) may be used alone, in combination with each other or in combination with other buffers. (We do not need to mention that. Our pH range is from 4.5 to 7).

6. Biocides

Biocides in amounts ranging from about 0.1 percent to about 0.5 percent by weight also may be used in formulating the ink compositions of the present invention. Examples of suitable biocides include, but are not limited to, PROXEL CRL and PROXEL GXL available from ICI (Great Britain) and NUOSEPT C and NUOSEPT 95 available from Nuodex, Inc. (Piscataway, N.J.).

III. Examples

In order to further illustrate the invention, some practical examples are set forth below. These examples are illustrative only and in no way are to be construed to limit the invention to the particular features described.

In general, the salt-based ink compositions of the present invention were prepared by placing the appropriate weight percent of the desired organic solvent(s) in an ink composition mixing bottle. The appropriate weight percent of the desired surfactant or combination of surfactants was then added to the organic solvent(s). Next, the appropriate weight percent of one or more ammonium salts was added to the organic solvent(s)/surfactant(s) mixture. About 10 percent to about 20 weight percent of water was then added to the solution and the ink composition mixing bottle was temporarily sealed. The solution in the ink composition mixing bottle was mixed at ambient temperature, on a parallel roller mixer for a time period of about 5 to 6 hours (or for a sufficient time period to ensure all solid components of the solution were substantially dissolved).

Following mixing, the desired dyes were added to the solution in amounts sufficient to reflect the desired absorbance values. The solution was then pH adjusted and mixed on the parallel roller mixer for a time period of about 1 hour (or for a time period sufficient to ensure substantial homogeneity of the resulting ink composition).

EXAMPLE 1

Several different cellulosic media and special media, including starch-coated media, clay-coated and/or silica-coated media, such as Hewlett-Packard's VIPER PLUS™, WEASAL™, were printed using a Hewlett-Packard thermal ink-jet pen. The ink composition used had the aqueous composition listed in Table II:

TABLE II

| COMPOUND | PERCENT BY WEIGHT |
|---|---|
| 1,5 Pentanediol | 8 |
| 2-Pyrrolidone | 7.5 |
| EHPD | 7.5 |
| Tergitol 15-S-5 | 1 |
| Ammonium Hydrogen Citrate | 8 |
| Dilute Nitric, Phosphoric, Hydrochloric and/or Sulfuric Acids | As required to adjust the pH to about 4.5 |
| Acid Yellow 23 (TMA) | 0.16* |

*absorbance units at 1:10,000 dilutions, measured utilizing a Hewlett-Packard UV/VIS II 8452A spectrometer.

The cloud point of the ink composition of this example was measured by first heating the ink composition for about 6 to about 7 hours at the following temperatures ranges: between about, 45° C. to 55° C.; 55° C. to 60° C.; 65° C. to 70° C.; and at about 75° C. Periodically during the heating process, the ink composition was visually checked to detect phase separation of the ink composition components or a cloudy appearance of the composition. The ink composition of this example showed no signs of phase separation or cloudiness at any of the above tested temperatures. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was determined by simulating office light conditions and exposing the printed images to conditions equivalent to 1 year of typical office light exposure. The color of the exposed printed image was then compared to the color of the original and unexposed printed image. The ink composition of this example was found to have superior light fastness on both cellulosic paper and special media.

The total organics of the ink composition listed in Table II was estimated to be from about 15 percent to about 40 percent, surface tension of the ink composition was determined to be about 25 to about 35 dynes/cm, and the viscosity of the ink composition was from about 2.5 to about 5 c.p.

EXAMPLE 2

Several different cellulosic media and special media, including starch-coated media, clay-coated and/or silica-coated media, such as Hewlett-Packard's VIPER PLUS™, WEASAL™, were printed using a Hewlett-Packard thermal ink-jet pen. The ink composition used had the aqueous composition listed in Table III:

TABLE III

| COMPOUND | PERCENT BY WEIGHT |
|---|---|
| 1,5 Pentanediol | 8 |
| 2-Pyrrolidone | 7.5 |
| EHPD | 7.5 |
| Tergitol 15-S-5 | 1 |
| Ammonium Hydrogen Citrate | 8 |
| Dilute Nitric, Phosphoric, Hydrochloric and/or Sulfuric Acids | As required to adjust the pH to about 4.5 |

TABLE III-continued

| COMPOUND | PERCENT BY WEIGHT |
|---|---|
| Reactive Red 180 (TMA) | 0.12* |
| Acid Red 52 (Li) | 0.18* |

*absorbance units at 1:10,000 dilutions, measured utilizing a Hewlett-Packard UV/VIS II 8452A spectrometer.

The cloud point of the ink composition of this example was measured as described above in Example I. The ink composition of this example showed no signs of phase separation or cloudiness at any of the tested temperatures, up to 70° C. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was measured as described above in Example I. The ink composition of this example was found to have superior light fastness on both cellulosic paper and special media.

The total organics of the ink composition listed in Table III was estimated to be from 15 percent to 40 percent, surface tension of the ink composition was determined to be about 25 to about 35 dynes/cm, and the viscosity of the ink composition was from about 2.5 to about 5 c.p.

EXAMPLE 3

Several different cellulosic media and special media, including starch-coated media, clay-coated and/or silica-coated media, such as Hewlett-Packard's VIPER PLUS™, WEASAL™, were printed using a Hewlett-Packard thermal ink-jet pen. The ink composition used had the aqueous composition listed in Table IV:

TABLE IV

| COMPOUND | PERCENT BY WEIGHT |
|---|---|
| 1,5 Pentanediol | 8 |
| 2-Pyrrolidone | 7.5 |
| EHPD | 7.5 |
| Tergitol 15-S-5 | 1 |
| Ammonium Hydrogen Citrate | 8 |
| Dilute Nitric, Phosphoric, Hydrochloric and/or Sulfuric Acids | As required to adjust the pH to about 4.5 |
| Direct Blue 199 | 0.12* |
| Acid Blue 9 | 0.16* |

*absorbance units at 1:10,000 dilutions, measured utilizing a Hewlett-Packard UV/VIS II 8452A spectrometer.

The cloud point of the ink composition of this example was measured as described above in Example I. The ink composition of this example showed no signs of phase separation or cloudiness at any of the tested temperatures, up to 70° C. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was determined as described above in Example I. The ink composition of this example was found to have superior light fastness on both cellulosic paper and special media.

The total organics of the ink composition listed in Table IV was estimated to be from 15 percent to 40 percent, surface tension of the ink composition was determined to be about 25 to about 35 dynes/cm, and the viscosity of the ink composition was from about 2.5 to about 5 c.p.

EXAMPLE 4

Several different cellulosic media and special media, including starch-coated media, clay-coated and/or silica-coated media, such as Hewlett-Packard's VIPER PLUS™, WEASAL™, were printed using a Hewlett-Packard thermal ink-jet pen. The ink composition used had the aqueous composition listed in Table V:

TABLE V

| COMPOUND | PERCENT BY WEIGHT |
|---|---|
| 1,5 Pentanediol | 8 |
| 2-Pyrrolidone | 7.5 |
| EHPD | 7.5 |
| IGEPAL ® CO-620 | 1.5 |
| Ammonium Hydrogen Citrate | 8 |
| Dilute Nitric, Phosphoric, Hydrochloric and/or Sulfuric Acids | As required to adjust the pH to about 4.5 |
| Direct Blue 199 | 0.12* |
| Acid Blue 9 | 0.16* |

*absorbance units at 1:10,000 dilutions, measured utilizing a Hewlett-Packard UV/VIS II 8452A spectrometer.

The cloud point of the ink composition of this example was measured as described above in Example I. The ink composition of this example showed no signs of phase separation or cloudiness at any of the tested temperatures, up to 70° C. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was determined as described above in Example I. The ink composition of this example was found to have superior light fastness on both cellulosic paper and special media.

EXAMPLE 5

Several different cellulosic media and special media, including starch-coated media, clay-coated and/or silica-coated media, such as Hewlett-Packard's VIPER PLUS™, WEASAL™, were printed using a Hewlett-Packard thermal ink-jet pen. The ink composition used had the aqueous composition listed in Table VI:

TABLE VI

| COMPOUND | PERCENT BY WEIGHT |
|---|---|
| 1,5 Pentanediol | 8 |
| 2-Pyrrolidone | 7.5 |
| EHPD | 7.5 |
| IGEPAL ® CO630 | 1.5 |
| Ammonium Hydrogen Citrate | 8 |
| Dilute Nitric, Phosporic, Hydrochloric and/or Sulfuric Acids | As required to adjust the pH to about 4.5 |
| Direct Blue 199 | 0.12* |
| Acid Blue 9 | 0.16* |

*absorbance units at 1:10,000 dilutions, measured utilizing a Hewlett-Packard UV/VIS II 8452A spectrometer.

The cloud point of the ink composition of this example was measured as described above in Example I. The ink composition of this example showed no signs of phase separation or cloudiness at any of the tested temperatures, up to 70° C. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was determined as described above in Example I. The ink composition of this example was found to have superior light fastness on both cellulosic paper and special media.

EXAMPLE 6

Several different cellulosic media and special media, including starch-coated media, clay-coated and/or silica-coated media, such as Hewlett-Packard's VIPER PLUS™, WEASAL™, were printed using a Hewlett-Packard thermal ink-jet pen. The ink composition used had the aqueous composition listed in Table VII:

TABLE VII

| COMPOUND | PERCENT BY WEIGHT |
|---|---|
| 1,5 Pentanediol | 8 |
| 2-Pyrrolidone | 7.5 |
| EHPD | 7.5 |
| ALCODET ™ - 260 | 1.5 |
| Ammonium Hydrogen Citrate | 8 |
| Dilute Nitric, Phosphoric, Hydrochloric and/or Sulfuric Acids | As required to adjust the pH to about 4.5 |
| Direct Blue 199 | 0.12* |
| Acid Blue 9 | 0.16* |

*absorbance units at 1:10,000 dilutions, measured utilizing a Hewlett-Packard UV/VIS II 8452A spectrometer.

The cloud point of the ink composition of this example was measured as described above in Example I. The ink composition of this example showed no signs of phase separation or cloudiness at any of the tested temperatures, up to 70° C. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was determined as described above in Example I. The ink composition of this example was found to have superior light fastness on both cellulosic paper and special media.

EXAMPLE 7

Several different cellulosic media and special media, including starch-coated media, clay-coated and/or silica-coated media, such as Hewlett-Packard's VIPER PLUS™, WEASAL™, were printed using a Hewlett-Packard thermal ink-jet pen. The ink composition used had the aqueous composition listed in Table VIII:

TABLE VIII

| COMPOUND | PERCENT BY WEIGHT |
|---|---|
| 1,5 Pentanediol | 8 |
| 2-Pyrrolidone | 7.5 |
| EHPD | 7.5 |
| MYRAPON - E825 ™ | 1.5 |
| Ammonium Hydrogen Citrate | 8 |
| Dilute Nitric, Phosphoric, Hydrochloric | As required to adjust |

TABLE VIII-continued

| COMPOUND | PERCENT BY WEIGHT |
|---|---|
| and/or Sulfuric Acids | the pH to about 4.5 |
| Direct Blue 199 | 0.12* |
| Acid Blue 9 | 0.16* |

*absorbance units at 1:10,000 dilutions, measured utilizing a Hewlett-Packard UV/VIS II 8452A spectrometer.

The cloud point of the ink composition of this example was measured as described above in Example I. The ink composition of this example showed no signs of phase separation or cloudiness at any of the tested temperatures, up to 70° C. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was determined as described above in Example I. The ink composition of this example was found to have superior light fastness on both cellulosic paper and special media.

EXAMPLE 8

Several different cellulosic media and special media, including starch-coated media, clay-coated and/or silica-coated media, such as Hewlett-Packard's VIPER PLUS™, WEASAL™, were printed using a Hewlett-Packard thermal ink-jet pen. The ink composition used had the aqueous composition listed in Table IX:

TABLE IX

| COMPOUND | PERCENT BY WEIGHT |
|---|---|
| 1,5 Pentanediol | 8 |
| 2-Pyrrolidone | 7.5 |
| EHPD | 7.5 |
| MYRAPON - E825 ™ | 1.5 |
| Ammonium Hydrogen Citrate | 8 |
| Dilute Nitric, Phosphoric, Hydrochloric and/or Sulfuric Acids | As required to adjust the pH to about 4.5 |
| Direct Yellow 132 and | 0.16 |
| Acid Yellow 23 Combination | 0.16 |

*absorbance units at 1:10,000 dilutions, measured utilizing a Hewlett-Packard UV/VIS II 8452A spectrometer.

The cloud point of the ink composition of this example was measured as described above in Example I. The ink composition of this example showed no signs of phase separation or cloudiness at any of the tested temperatures, up to 70° C. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was determined as described above in Example I. The ink composition of this example was found to have superior light fastness on both cellulosic paper and special media.

EXAMPLE 9

Several different cellulosic media and special media, including starch-coated media, clay-coated and/or silica-coated media, such as Hewlett-Packard's VIPER PLUSTM, WEASALTM, were printed using a Hewlett-Packard thermal ink-jet pen. The ink composition used had the aqueous composition listed in Table X:

TABLE X

| COMPOUND | PERCENT BY WEIGHT |
|---|---|
| 1,5 Pentanediol | 8 |
| 2-Pyrrolidone | 7.5 |
| EHPD | 7.5 |
| MYRAPON - E825 ™ | 1.5 |
| Ammonium Hydrogen Citrate | 8 |
| Dilute Nitric, Phosphoric, Hydrochloric and/or Sulfuric Acids | As required to adjust the pH to about 4.5 |
| Magenta M377 and | 0.18 |
| Acid Red 52 (Li) Combination | 0.18 |

*absorbance units at 1:10,000 dilutions, measured utilizing a Hewlett-Packard UV/VIS II 8452A spectrometer.

The cloud point of the ink composition of this example was measured as described above in Example I. The ink composition of this example showed no signs of phase separation or cloudiness at any of the tested temperatures, up to 70° C. Additionally, the ink composition of this example showed excellent black-to-color and color-to-color bleed characteristics on cellulosic paper and special media and good edge acuity print characteristics. The ink composition of this example was not susceptible to decel at high ejection frequency.

Light fastness of the ink composition of this example was determined as described above in Example I. The ink composition of this example was found to have superior light fastness on both cellulosic paper and special media.

Although the foregoing invention has been described in connection with preferred and alternative embodiments, it will be appreciated by one of ordinary skill that various modifications and variations may be substituted for the ink compositions and methods described herein without departing from the scope and spirit of the invention, as defined by the appended claims and their equivalents.

What is claimed is:

1. An ink composition comprising an ammonium carboxylate salt and a surfactant, the ammonium carboxylate salt present in an amount of from about 2 to about 15 wt percent wherein the ammonium carboxylate satisfies the formula:

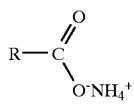

wherein R is selected from the group consisting of alkanes, alkenes, alkynes, alkoxys, carboxylates, ammonium carboxylates, and mixtures thereof, wherein the alkanes, alkenes, alkynes, alkoxys, carboxylates, ammonium carboxylates include straight chained structures, branched-chained structures, stereoisomers, hydroxyl groups, sulfhydryl groups, amines, carbonyls, carboxyl groups, halogens and mixtures thereof and surfactant being present in an amount sufficient to substantially prevent thermally induced phase separation up to about 70° C.

2. The ink composition of claim 1 wherein the surfactant is present in an amount of from about 0.25 to about 10 weight percent.

3. The ink composition of claim 1 wherein the ammonium carboxylate is selected from the group consisting of ammonium hydrogen citrate, ammonium lactate, ammonium gluconate, ammonium tartrate, ammonium succinate, ammonium malonate, ammonium fumarate, ammonium malate, ammonium sebacate, ammonium laurate, ammonium glutarate, ammonium acetate, ammonium oxylate, ammonium adipicate, ammonium pimelicate, ammonium subericate, ammonium azelaicate, and mixtures thereof.

4. The ink composition of claim 1 wherein the surfactant is selected from the group consisting of non-ionic ethoxylates, hydroxylated acetylenic polyethylene oxides, alkoxylated acetylenic polyethylene oxides, anionic phosphates esters, and mixtures thereof.

5. The ink composition of claim 1 wherein the surfactant is present in an amount of from about 0.5 to about 5 weight percent.

6. The ink composition of claim 5 wherein the surfactant is an ethoxylated surfactant.

7. The ink composition of claim 5 wherein the ethoxylated surfactant is non-ionic.

8. The ink composition of claim 6 wherein the ethoxylated surfactant is a secondary alcohol ethoxylate.

9. The ink composition of claim 6 wherein the ethoxylated surfactant is a secondary alcohol ethoxylate having an aliphatic chain of from about 12 to about 18 carbon atoms and from about 4 to about 8 ethoxylate groups.

10. The ink composition of claim 6 wherein the ethoxylated surfactant is a secondary alcohol ethoxylate having an aliphatic chain of about 15 carbon atoms and having about 5 ethoxylate groups.

11. The ink composition of claim 6 wherein the ethoxylated surfactant is a secondary alcohol ethoxylate having an aliphatic chain of about 15 carbon atoms and having about 7 ethoxylate groups.

12. The ink composition of claim 2 wherein the surfactant is a secondary alcohol ethoxylate having an aliphatic chain of from about 12 to about 18 carbon atoms, from about 4 to about 8 ethoxylate groups, and has a HLB balance in the range of from about 10 to about 13.

13. The ink composition of claim 1 wherein the surfactant is selected from the group consisting of hydroxylated acetylenic polyethylene oxides, alkoxylated acetylenic polyethylene oxides, and mixtures thereof.

14. The ink composition of claim 13 wherein the surfactant is present in an amount of from about 0.5 to about 5 weight percent.

15. An ink composition that substantially prevents thermally induced phase separation up to about 70° C., the ink composition comprising:

an ammonium carboxylate present in an amount of from about 2 to about 15 weight percent, wherein the ammonium carboxylate satisfies the formula (3)

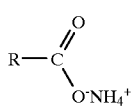

wherein R is selected from the group consisting of alkenes, alkynes, alkoxys, carboxylates, ammonium carboxylates, and mixtures thereof, wherein the alkanes, alkenes, alkynes, alkoxys, carboxylates, ammonium carboxylates include straight-chained structures, branched-chained structures, stereoisomers, hydroxyl groups, sulfhydryl groups, amines, carbonyls, carboxyl groups, halogens, and mixtures thereof;

a surfactant present in an amount of from about 0.25 to about 10 weight percent, wherein the surfactant is selected from the group consisting of (a) compounds satisfying the formula

wherein R=$C_{12}$ to $C_{16}$, n=1 to 11.5, (b) compounds satisfying the formula (2)

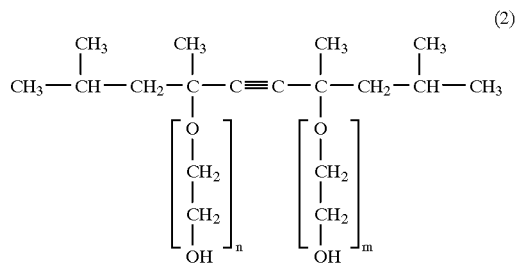

wherein n+m=0 to 50, and mixtures thereof;

about 0 percent to about 40 percent by weight organic solvent; and about 0.5 percent to about 20 percent by weight dye.

16. The ink composition of claim 13 wherein the ammonium carboxylate is present in an amount of from about 4 percent to about 10 percent by weight and is selected from the group consisting of ammonium hydrogen citrate, ammonium lactate, ammonium gluconate, ammonium tartrate, ammonium succinate, ammonium malonate, ammonium fumarate, ammonium malate, ammonium sebacate, ammonium laurate, ammonium glutarate, ammonium acetate, ammonium oxylate, ammonium adipicate, ammonium pimelicate, ammonium subericate, and ammonium azelaicate, and mixtures thereof.

17. The ink composition of claim 13 wherein the surfactant is a secondary alcohol ethoxylate having an aliphatic chain of about 15 carbon atoms and about 7 ethoxylate groups.

18. An aqueous ink composition that substantially prevents thermally induced phase separation up to about 70° C., the ink composition comprising:

an ammonium carboxylate present in an amount of from about 4 percent to about 10 percent by weight and selected from the groups consisting of ammonium hydrogen citrate, ammonium lactate, ammonium gluconate, ammonium tartrate, ammonium succinate, ammonium malonate, ammonium fumarate, ammonium malate, ammonium sebacate, ammonium laurate, ammonium glutarate, ammonium acetate, ammonium oxylate, ammonium adipicate, ammonium pimelicate, ammonium subericate, and ammonium azelaicate, and mixtures thereof;

an ethoxylated surfactant present in an amount of about 1.5 percent by weight wherein the ethoxylated surfactant is a secondary alcohol ethoxylate having an aliphatic chain of about 15 carbon atoms and having about 5 ethoxylated units; and about 0 percent to about 40 percent by weight organic solvent selected from the group consisting of 1,5-pentanediol, 2-pyrrolidone, ethylyhydroxypropanediol, and mixtures thereof.

19. The ink composition of claim 15 wherein the ammonium carboxylate is ammonium hydrogen citrate.

* * * * *